D. H. PADDEN.
RESILIENT WHEEL.
APPLICATION FILED MAR. 21, 1913.
1,152,966. Patented Sept. 7, 1915.
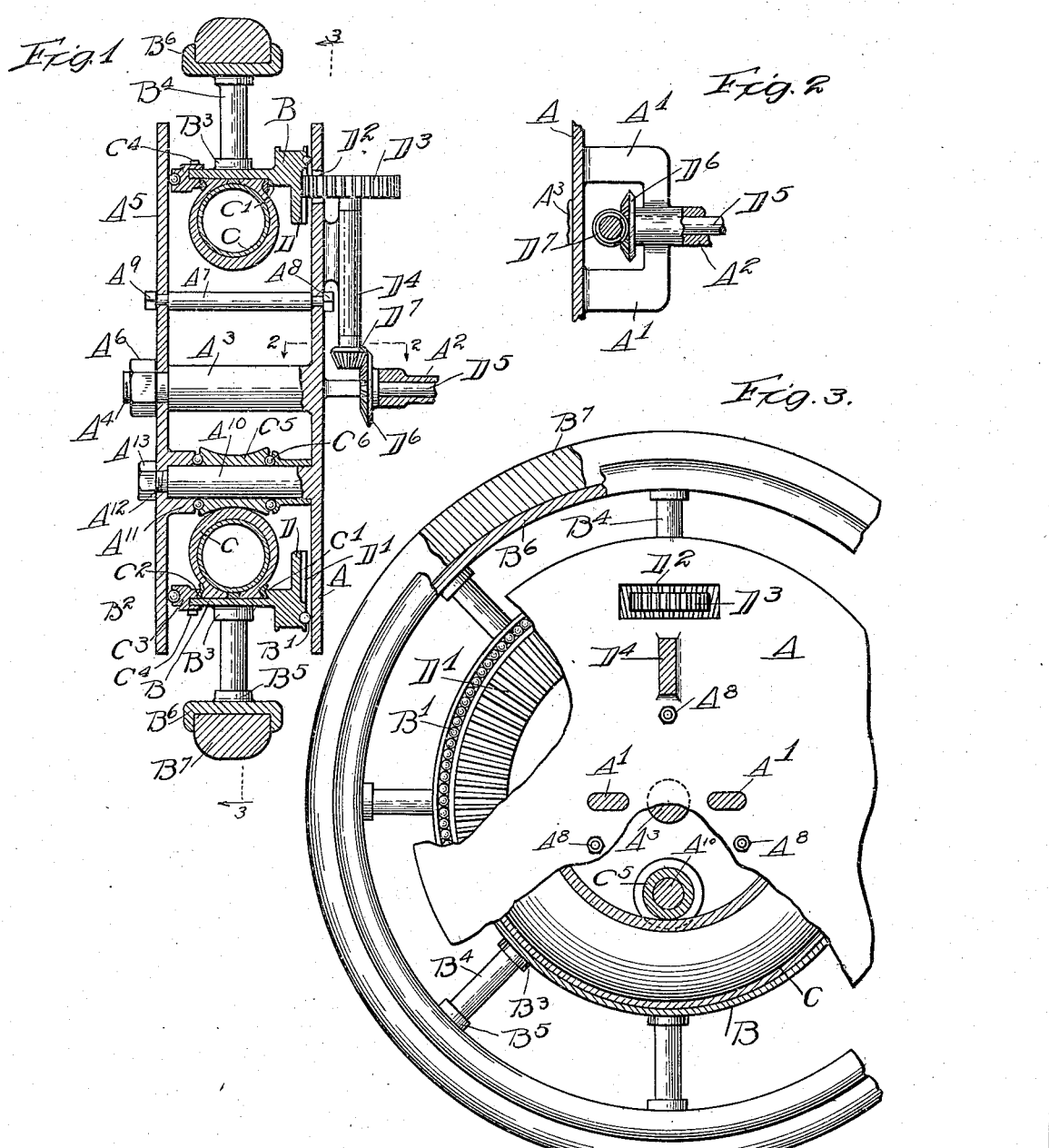
Witnesses:
Inventor:
David H. Padden
by Parker & Carter
his Attys.

UNITED STATES PATENT OFFICE.

DAVID H. PADDEN, OF CHICAGO, ILLINOIS.

RESILIENT WHEEL.

1,152,966. Specification of Letters Patent. Patented Sept. 7, 1915.

Application filed March 21, 1913. Serial No. 755,861.

*To all whom it may concern:*

Be it known that I, DAVID H. PADDEN, a citizen of the United States, residing at Chicago, in the county of Cook and State of Illinois, have invented a certain new and useful Improvement in Resilient Wheels, of which the following is a specification.

My invention relates to improvements in resilient wheels such as are particularly designed to give that resiliency which only an air containing pneumatic tire can give and which still will be free from many of the inherent difficulties of the pneumatic tire.

It is illustrated diagrammatically in one form in the accompanying drawing wherein—

Figure 1 is a vertical section through my wheel in the plane of the axle; Fig. 2 is a section along line 2—2 of Fig. 1; and Fig. 3 is a section along line 3—3 of Fig. 1.

Like parts are indicated by the same letters throughout the several figures.

The flat plate or disk A is connected by means of the yoke members $A^1$, $A^1$ to the hollow or tubular axle $A^2$. The cylindrical lug $A^3$ projects outwardly from the center of the disk A and terminates in a screw-threaded member $A^4$. A disk $A^5$ of substantially the same diameter as the disk A is mounted on the screw-threaded member $A^4$, being held snugly against the end of the lug $A^3$ by the nut $A^6$. Spacing sleeves $A^7$, $A^7$ are interposed between the disks A, $A^5$ and cap screws $A^8$ provided with tightening nuts $A^9$ are adapted to tie the disks together, these screws being located within the spacing sleeves $A^7$. A pin $A^{10}$ projects outwardly from the disk A at a point immediately below the lug $A^3$ and may be if desired made integral with the disk A or otherwise as the case may be. An annular boss $A^{11}$ projects inwardly from the plate $A^5$ and is adapted to closely fit and engage the end of the pin $A^{10}$. The screw $A^{12}$ projects outwardly from the end of the pin $A^{10}$ through a plate $A^5$ and is provided with a nut $A^{13}$ whereby the disk may be firmly held against the end of the pin. The two disks are by the members above shown thus rigidly bound into position with respect one to the other in such wise that they will maintain their parallelism and in such wise that the distance between them will not vary and that they are held against relative rotational displacement.

The annular ring B is provided with ball bearings $B^1$, $B^2$ in engagement respectively with the flat inner surfaces of the disks A, $A^5$, these bearings being as indicated in Fig. 3 substantially continuous to give two annular ball bearing rings of contact between the annular ring B and the plates A, $A^5$ respectively, thus leaving the annular ring B free to rotate between the plates and free to move slidably in a plane perpendicular to its rotational axis but held against rocking movement. The pockets $B^3$ are located about the outer periphery of the ring B, and in these pockets are held the spoke members $B^4$, the outer ends of which are engaged by the pockets $B^5$ on the tread rim $B^6$, which tread rim holds the spokes firmly in position and is provided with a more or less resilient cushion tread $B^7$. The rings $B^6$ and B, all the spokes and kindred parts thus form a rotatable tread member or wheel rotating between the fixed guide flanges or plates.

A pneumatic tire C is located on the inside of the annular ring B, being held in position therein by any suitable means. For instance, I have shown the bead of the tire which in this case is on the outside instead of on the inside engaged on one side by an inclined surface or channel wall $C^1$ integral with and forming a rigid part of the annular ring B and on the other side by a wall $C^2$ mounted on the ring $C^3$, which forms a portion of the annular ring B and overlaps upon it and is held in position by the screws $C^4$. It will be evident that other means might be used, but the means shown are sufficient for the purpose of illustration.

The pin $A^{10}$ has rotatably mounted thereon a concave roller or bearing wheel $C^5$ supported on the ball bearings $C^6$. This roller is adapted to ride upon the inner tread surface of the tire C. Thus, when the wheel supports the vehicle, the pressure or weight of the vehicle is applied through the axle $A^2$ to the disks A, $A^5$ and since the roller $C^5$ is swung between the disks $A^5$ the weight of the car will be centered within the roller upon the tread surface of the pneumatic tire, which tire is supported by the rotary tread member or wheel.

The annular ring B is provided with an inwardly extending annular flange or collar D provided with gear teeth as indicated at D¹. The plate A is apertured as at D², and a driving pinion D³ rotatably mounted on the bearing D⁴ on the plate A is in mesh with the teeth D¹. This driving pinion is driven from the driving axle D⁵ through a miter gear D⁶ and miter pinion D⁷. When the driving axle D⁵ is rotated by the engine in any suitable manner it causes the pinion D³ to rotate. The rotation of this pinion being as it is in mesh with the teeth on the tread member causes this member to rotate with respect to the fixed guide disks or plates and the car will be driven forward. If this wheel were to be used as an idler or front wheel instead of a rear driving wheel it would be necessary to dispense with the driving pinion and driving connections and to omit the gear teeth on the annular ring.

It will be evident that the wheel spokes are very short and therefore very strong and not at all likely to break, bend or buckle. It will be noted that the turning or tipping moment such as is always present in the automobile wheel is resisted by the annular ball bearings at points considerably removed from the center of rotation. Thus the pressure upon these bearings will at all times be very slight.

The pneumatic tire is located within the wheel and protected from the danger of cutting, puncturing and the like. It is in contact only with the smooth bearing roller, and thus abrasion on the part of the tire will be reduced to a minimum. As the tire expands and contracts under the varying loads caused by the wheels going over bumps and into gullies and ditches and the like or other irregularities in the road, the wheel will slide at a point between the guide plates but still continue to rotate, and, since the gear teeth on the driving pinion are approximately radial, they will at all times be in mesh with the teeth on the wheel and the wheel will at all times continue to be driven from the engine.

It will be evident that the drawing of my device is to a large extent diagrammatic, but the device I have shown is operative, that is to say it might be made to operate, although, of course, it is probable that in order to make it a commercially successful device changes might have to be made. I wish, therefore, that my device be regarded as in a sense diagrammatic and that it be understood that changes might be made in size, shape and the substantial arrangement of parts without departing materially from the spirit of my invention.

I claim:—

1. A wheel having an inner and an outer tread and laterally projecting annular portions intermediate the treads and a guide comprising two disk-like parts of less diameter than the wheel and rigidly secured together, the wheel being placed between them and held in parallelism through the annular projections.

2. A wheel having an outer tread and inner pneumatic tread and two laterally projecting annular portions, the guide consisting of two disk-like bodies between which the wheel is inclosed, cross bars for connecting them together, means for centering the wheel within the guide so that it projects therefrom and bearings between the annular projections and the disks.

3. A wheel having an outer tread and inner pneumatic tread and two laterally projecting annular portions, the guide consisting of two disk-like bodies between which the wheel is inclosed, cross bars for connecting them together, means for centering the wheel within the guide so that it projects therefrom and bearings between the annular projections and the disks, and means for rotating the tire.

4. A wheel comprising a rotary annular tread member, a pneumatic tire on the inner side thereof, and a bearing roller in contact with and supported by and free to travel along said pneumatic tire.

5. A wheel comprising a rotary annular tread member, a pneumatic tire on the inner side thereof, and a bearing roller in contact with and supported by and free to travel along said pneumatic tire and means for supporting said roller and holding said annular tread member against tipping.

6. A wheel comprising an annular ring having inner and outer peripheral tread surfaces, guide plates located in either side of said ring, said ring being free to move transversely and to rotate between said plates, means for supporting said plates upon the inner peripheral tread of the wheel, means for holding said plates rigidly in fixed position with respect each to the other.

7. A wheel comprising an annular ring having inner and outer peripheral tread surfaces, guide plates located in either side of said ring, said ring being free to move transversely and to rotate between said plates, means for supporting said plates upon the inner peripheral tread of the wheel, means for holding said plates rigidly in fixed position with respect each to the other, and means carried by said plates and independent of the displacement of the wheel with respect thereto for rotating the wheel with respect thereto.

8. A wheel comprising an annular ring having inner and outer peripheral tread surfaces, guide plates located in either side of said ring, said ring being free to move transversely and to rotate between said plates, means for supporting said plates upon the inner peripheral tread of the wheel, means for holding said plates rigidly in fixed position with respect each to the other, said plates in engagement with the sides of the wheel removed from the tread surfaces.

In testimony whereof, I affix my signature in the presence of two witnesses this 18th day of March 1913.

DAVID H. PADDEN.

Witnesses:
LILLIAN G. ROSS,
GENEVA HIRTH.

Copies of this patent may be obtained for five cents each, by addressing the "Commissioner of Patents, Washington, D. C."